United States Patent
Bosch et al.

(10) Patent No.: US 6,417,858 B1
(45) Date of Patent: Jul. 9, 2002

(54) PROCESSOR FOR GEOMETRY TRANSFORMATIONS AND LIGHTING CALCULATIONS

(75) Inventors: Derek Bosch; Carroll Philip Gossett, both of Mountain View; Ian O'Donnell, Berkeley; Anan Nagarajan, Palo Alto; Adrian Jeday, San Francisco; Eric Demers, Redwood City; Vimal Parikh, Fremont; Shaun Ho, Cupertino, all of CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/220,156

(22) Filed: Dec. 23, 1998

(51) Int. Cl.[7] .................................................. G06T 1/00
(52) U.S. Cl. ........................ 345/522; 345/503; 345/426; 712/245
(58) Field of Search .............................. 345/418, 419, 345/426, 427, 430, 503, 519, 522, 582; 712/220, 221, 223, 245

(56) References Cited

U.S. PATENT DOCUMENTS

| | | | | |
|---|---|---|---|---|
| 4,866,637 A | * | 9/1989 | Gonzalez-Lopez et al. | 345/426 |
| 4,901,064 A | * | 2/1990 | Deering | 345/426 |
| 5,764,994 A | * | 6/1998 | Craft | 395/709 |
| 5,926,406 A | * | 7/1999 | Tucker et al. | 708/606 |
| 5,956,042 A | * | 9/1999 | Tucker et al. | 345/426 |
| 6,008,820 A | * | 12/1999 | Chauvin et al. | 345/502 |
| 6,115,733 A | * | 9/2000 | Oberman et al. | 708/654 |
| 6,169,554 B1 | * | 1/2001 | Deering | 345/434 |
| 6,198,488 B1 | * | 3/2001 | Lindholm et al. | 345/426 |
| 6,219,071 B1 | * | 4/2001 | Krech, Jr. et al. | 345/503 |
| 6,229,553 B1 | * | 5/2001 | Duluk, Jr. et al. | 345/506 |
| 6,243,732 B1 | * | 6/2001 | Arakawa et al. | 708/520 |
| 6,304,265 B1 | * | 10/2001 | Harris et al. | 345/421 |

* cited by examiner

Primary Examiner—Ulka J. Chauhan
(74) Attorney, Agent, or Firm—Woodcock Washburn LLP

(57) ABSTRACT

A processor for computer graphics calculations comprising an entire graphics engine in a single integrated circuit. The processor includes a transform mechanism adapted to compute transforms for the computer graphics calculations. The transform mechanism includes a transformation element adapted to compute transforms using a dot product operation. The transform mechanism of the processor also includes a perspective division element, a color unit for lighting calculations, a scaling element for multiplication operations, and a look-up table containing mathematical functions used by the computer graphics calculations. The processor also includes a raster unit coupled to the transform mechanism, a texture unit coupled to the raster unit, and a shader unit coupled to the texture unit.

36 Claims, 6 Drawing Sheets

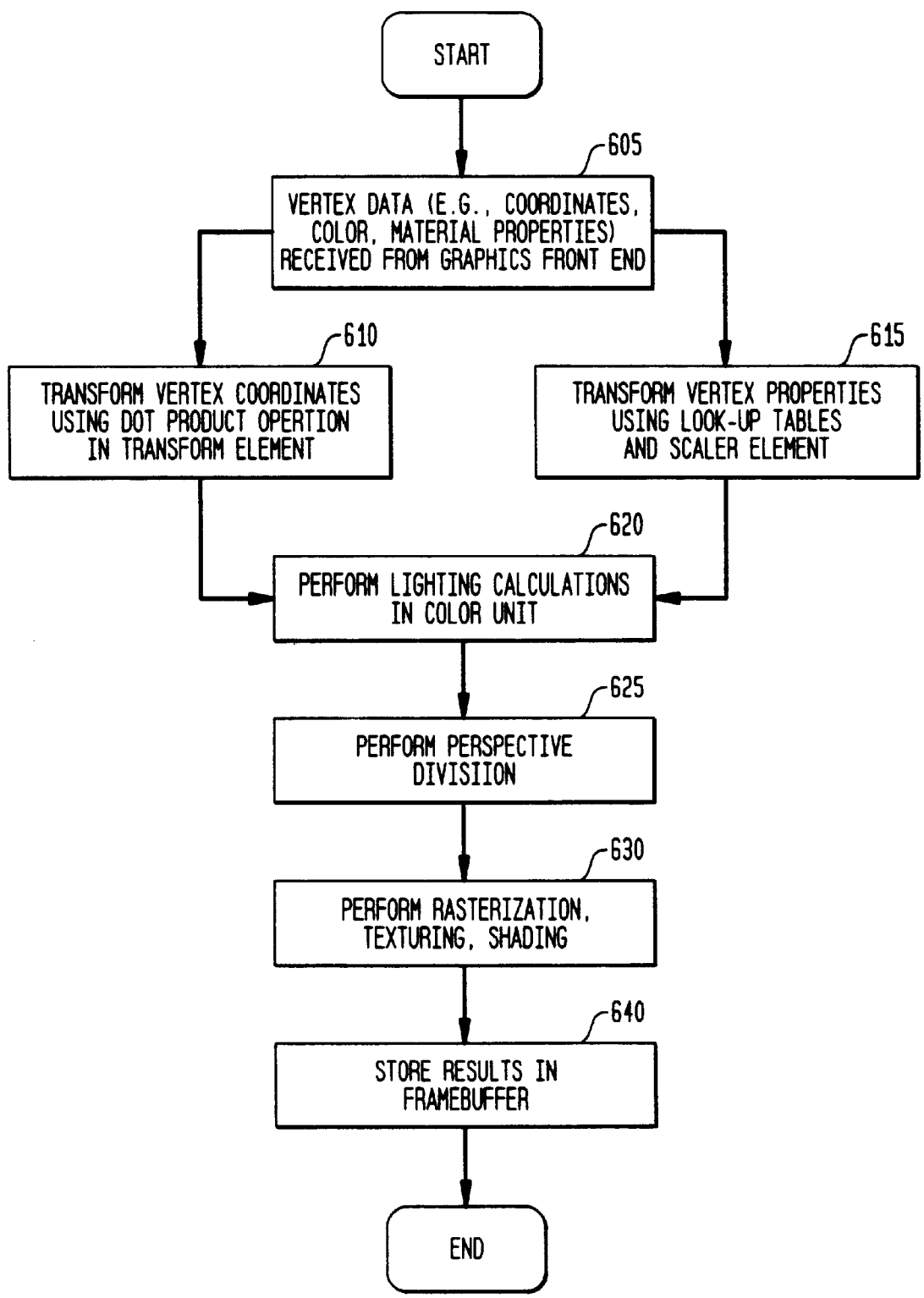

PROCESSOR FOR GEOMETRY TRANSFORMATIONS AND LIGHTING CALCULATIONS

TECHNICAL FIELD

The present invention pertains to the field of computer graphics design. More specifically, the present invention pertains to an integrated circuit used to perform geometry and lighting calculations that are used in computer graphics design.

BACKGROUND ART

Computer graphics design generally consists of instructions implemented via a graphics program on a computer system. The instructions are used to specify the calculations and operations needed to produce three-dimensional displays. OpenGL by Silicon Graphics, Inc., of Mountain View, Calif., exemplifies a system of graphics instructions used by graphics designers and artists.

Computer graphics design can be envisioned as a pipeline through which data pass, where the data are used to define the image to be produced and displayed. At various points along the pipeline, various calculations and operations are specified by the graphics designer, and the data are modified accordingly.

In the initial stages of the pipeline, the desired image is framed using geometric shapes such as lines and polygons, referred to in the art as "primitives." The derivation of the vertices for an image and the manipulation of the vertices to provide animation entail performing numerous geometric calculations in order to project the three-dimensional world being designed to a position in the two-dimensional world of the display screen.

Primitives are then assembled into "fragments," and these fragments are assigned attributes such as color, perspective, and texture. In order to enhance the quality of the image, effects such as lighting, fog, and shading are added, and anti-aliasing and blending functions are used to give the image a smoother and more realistic appearance. The processes pertaining to assigning colors, depth, texturing, lighting, etc., are collectively known as rasterization.

In the final stage, the fragments and their associated attributes are stored in the framebuffer. The pixel values are read from the framebuffer and used to draw images on the computer screen.

With reference now to Prior Art FIG. 1, process 130 exemplifies a graphics design process implemented using a graphics program on a computer system. Process 130, also referred to in the art as a state machine or a rendering pipeline, enables the designer to produce three-dimensional images using different computer systems and processors.

Process 130 operates on vertex (or geometric) data 131. The process stages within process 130 consist of display list 133, evaluators 134, per-vertex operations and primitive assembly 135, rasterization 138, per-fragment operations 139, and framebuffer 140.

Vertex data 131 are loaded from the computer system's memory and saved in display list 133. When display list 133 is executed, evaluators 134 derive the coordinates, or vertices, that are used to describe points, lines, polygons, and the like (e.g., primitives). All geometric primitives are eventually described by vertices.

With reference still to Prior Art FIG. 1, in per-vertex operations and primitive assembly 135, vertex data 131 are converted into primitives that are assembled to represent the surfaces to be graphically displayed. Some vertex data (for example, spatial coordinates) are transformed by four-by-four floating point matrices to project the spatial coordinates from a position in the three-dimensional world to a position on the display screen. In addition, advanced features are also performed in per-vertex operations and primitive assembly 135. Texturing coordinates may be generated and transformed. Lighting calculations are performed using the transformed vertex, the surface normal, material properties, and other lighting information to produce a color value. Perspective division, which is used to make distant objects appear smaller than closer objects in the display, also occurs in per-vertex operations and primitive assembly 135.

Rasterization 138 is the conversion of vertex data into "fragments." Each fragment corresponds to a single element (e.g., a "pixel") in the graphics display, and typically includes data defining color, shading, and texture. Thus, for a single fragment, there are typically multiple pieces of data defining that fragment.

Per-fragment operations 139 consist of additional operations that may be enabled to enhance the detail of the fragments, such as blending, dithering and other like operations. After completion of these operations, the processing of the fragment is complete and it is written as a pixel to framebuffer 140. Thus, there are typically multiple pieces of data defining each pixel.

Continuing with reference to Prior Art FIG. 1, a disadvantage to the prior art is that the graphics design process (e.g., process 130) is implemented using a strictly segmented computer system architecture. The architecture of the prior art utilizes graphics front end unit 150 that executes display list 133 and evaluators 134. The information is next sent to geometry engine 160, which is a separate processor for executing per-vertex operations and primitive assembly 135. The information is then sent to rasterization engine 170, which typically is a separate processor for executing rasterization 138 and per-fragment operations 139.

Thus, the computer system architecture of the prior art is problematic because it requires additional hardware such as additional processors for the various segments of the graphics design process, and it is therefore more expensive. In addition, the prior art is problematic because control of the graphics design process is made more complex by segmenting the process. Hence, in the prior art, additional space is required to store and execute the microcode used to control the overall process and the segments of the process, requiring that the processors be larger in size and thereby also increasing the expense.

The prior art is also problematic because the computer systems utilize general purpose processors to execute the operations and calculations required by the graphics program. Accordingly, the calculations are specified using general operations so that they can be executed by general purpose processors. For example, in the prior art, multiplication between a vector and a matrix in order to transform vertex data is performed by iterating through the matrix, multiplying each component of the matrix by the vector, and adding the results. This prior art method requires additional logic and more complex microcode instructions, and thus takes longer to accomplish. Hence, another disadvantage to the prior art is the speed at which the graphics program is executed is significantly reduced. Because processing speed is limited, the complexity of scenes which can be rendered is also limited. In addition, the additional logic and coding increases the size and also the expense of the processors used in the prior art.

Accordingly, what is needed is a mechanism for implementing the graphics design process that reduces the expense of the associated hardware. What is further needed is a mechanism that accomplishes the above and also increases the speed at which the graphics program is executed. The present invention provides a novel solution to the above needs.

These and other objects and advantages of the present invention will become obvious to those of ordinary skill in the art after having read the following detailed description of the preferred embodiments which are illustrated in the various drawing figures.

DISCLOSURE OF THE INVENTION

The present invention provides a mechanism for implementing the graphics design process that reduces the expense of the associated hardware. The present invention also provides a mechanism that accomplishes the above and increases the speed at which the graphics program is executed.

The present invention is a processor for computer graphics calculations comprising an entire graphics engine in a single integrated circuit. In one embodiment, the processor is a RISC (reduced instruction set computer) processor.

In the present embodiment, the processor includes a transform mechanism that includes a transformation element (e.g., a dot product unit) adapted to compute transforms (e.g., dot products) used by the computer graphics calculations, a color unit for lighting calculations, and a perspective division element coupled to the transformation element.

In the present embodiment of the present invention, the transform mechanism of the processor also includes a scaling element for multiplication operations and a look-up table containing mathematical functions used by the computer graphics calculations.

The processor also includes a raster unit coupled to the transform mechanism, a texture unit coupled to the raster unit, and a shader unit coupled to the texture unit. Thus, the present invention comprises an entire graphics engine in a single processor.

In the present embodiment, the transform mechanism is adapted to perform a dot product operation by computing the dot product of the vector representing the coordinates of a vertex with a row of a coordinate transformation matrix. The present invention utilizes hardware specifically designed to compute the dot product, thereby increasing processing speed and simplifying control of the process.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 6 is a flowchart of a process for performing graphics design calculations using the processor of FIG. 3 in accordance with one embodiment of the present invention.

BEST MODE FOR CARRYING OUT THE INVENTION

Figure 1:
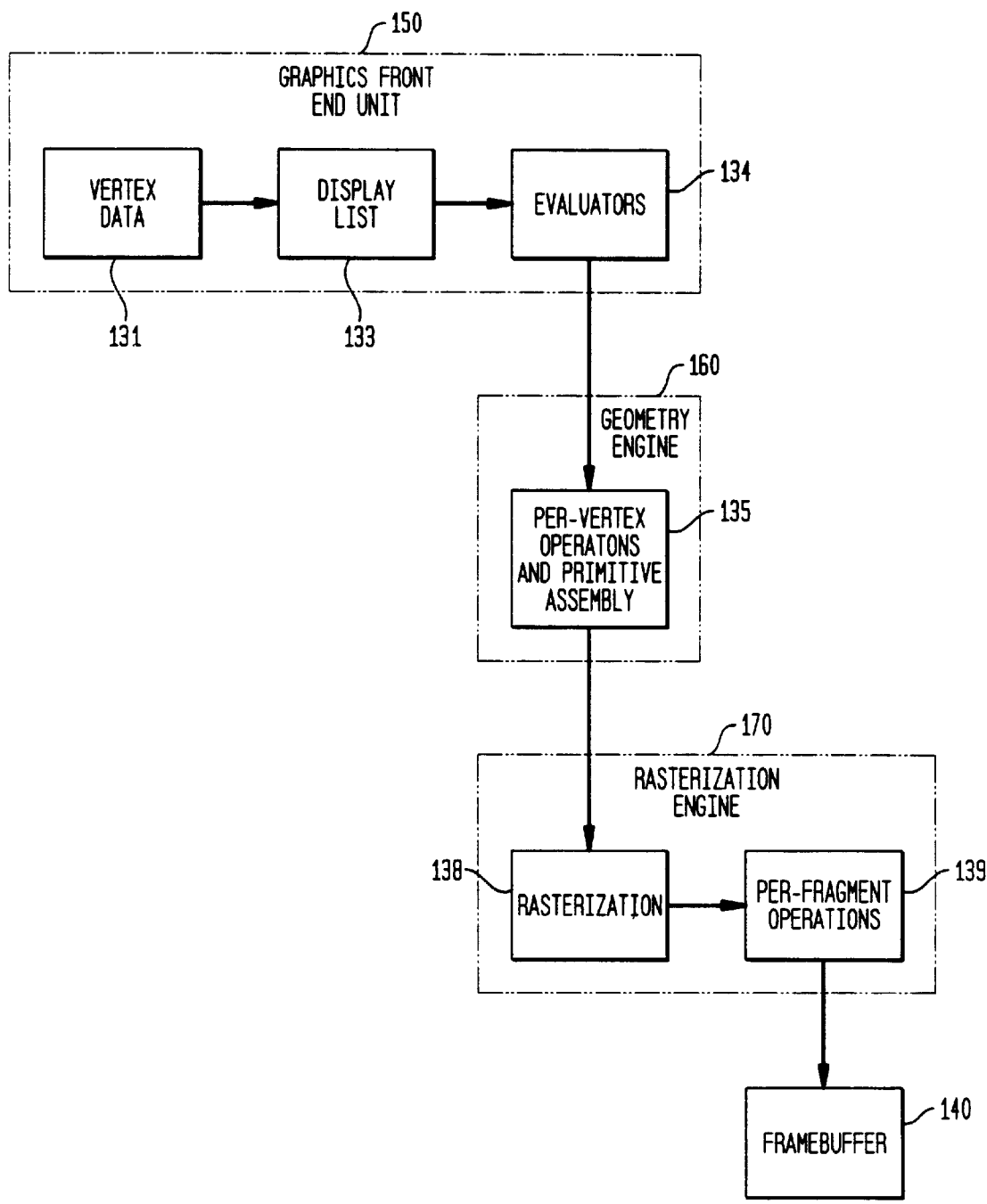
FIG. 1 is a diagram of a prior art process for performing graphics calculations.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

As used herein, a transaction refers to the transmission or receipt of data or other such message information. The transaction may consist of all data associated with a particular computer system operation (e.g., a request or command). A transaction may also consist of a block of data associated with a particular operation; for example, a transfer of data may be broken down into several blocks of data, each block transferred prior to the transfer of a subsequent block, and each block making up a transaction.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing," "operating," "calculating," "determining," "displaying," or the like, refer to actions and processes of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems.

The present invention is a processor for computer graphics calculations. The present embodiment of the present invention comprises an entire graphics engine, including a transform engine for geometry calculations, a raster unit, a texture unit, a shader unit, and a color unit for lighting calculations, in a single integrated circuit. In one embodiment, the processor is a RISC (reduced instruction set computer) processor.

Figure 2:
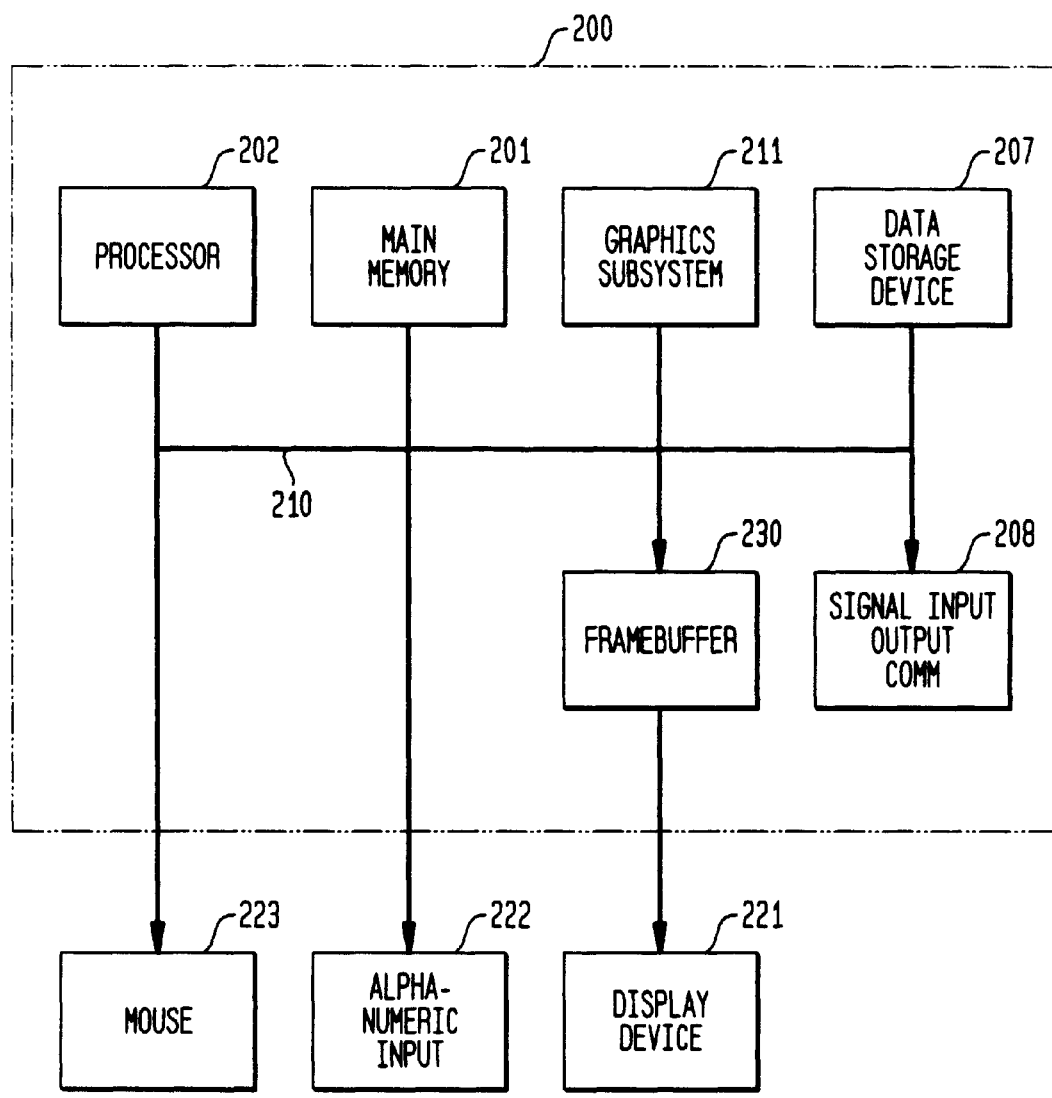
FIG. 2 is a block diagram of a computer system for performing graphics design calculations in accordance with one embodiment of the present invention.

FIG. 2 is a block diagram of graphics computer system 200 upon which the present embodiment of the present invention can be implemented. Computer system 200 exemplifies a computer-controlled graphics systems for generating complex or three-dimensional images.

Computer system 200 comprises a bus or other communication means 210 for communicating information, and a processor 202 coupled with bus 210 for processing information. Computer system 200 further comprises a random access memory (RAM) or other dynamic storage device 204 (main memory 204) coupled to bus 210 for storing information and instructions to be executed by processor 202. Main memory 204 also may be used for storing temporary variables or other intermediate information during execution of instructions by processor 202. Data storage device 207 is coupled to bus 210 and is used for storing information and instructions. Furthermore, signal input/output (I/O) communication device 208 is used to couple computer system 200 onto, for example, a network.

Computer system 200 can also be coupled via bus 210 to an alphanumeric input device 222, including alphanumeric and other keys, which is used for communicating information and command selections to processor 202. Another type of user input device is mouse 223 (or a like device such as a trackball or cursor direction keys) which is used for communicating direction information and command selections to processor 202 and for controlling cursor movement on display device 221. This input device typically has two degrees of freedom in two axes, a first axis (e.g., x) and a second axis (e.g., y), which allows the device to specify positions in a plane.

In accordance with the present invention, also coupled to bus 210 is graphics subsystem 211. Processor 202 provides graphics subsystem 211 with graphics data such as drawing commands, coordinate vertex data, and other data related to an object's geometric position, color, and surface parameters. In general, graphics subsystem 211 processes the graphical data, converts the graphical data into a screen coordinate system, generates pixel data (e.g., color, shading, texture) based on the primitives (e.g., points, lines, polygons, and meshes), and performs blending, antialiasing, and other functions. The resulting data are stored in framebuffer 230. A display subsystem (not shown) reads framebuffer 230 and displays the image on display device 221.

Figure 3:
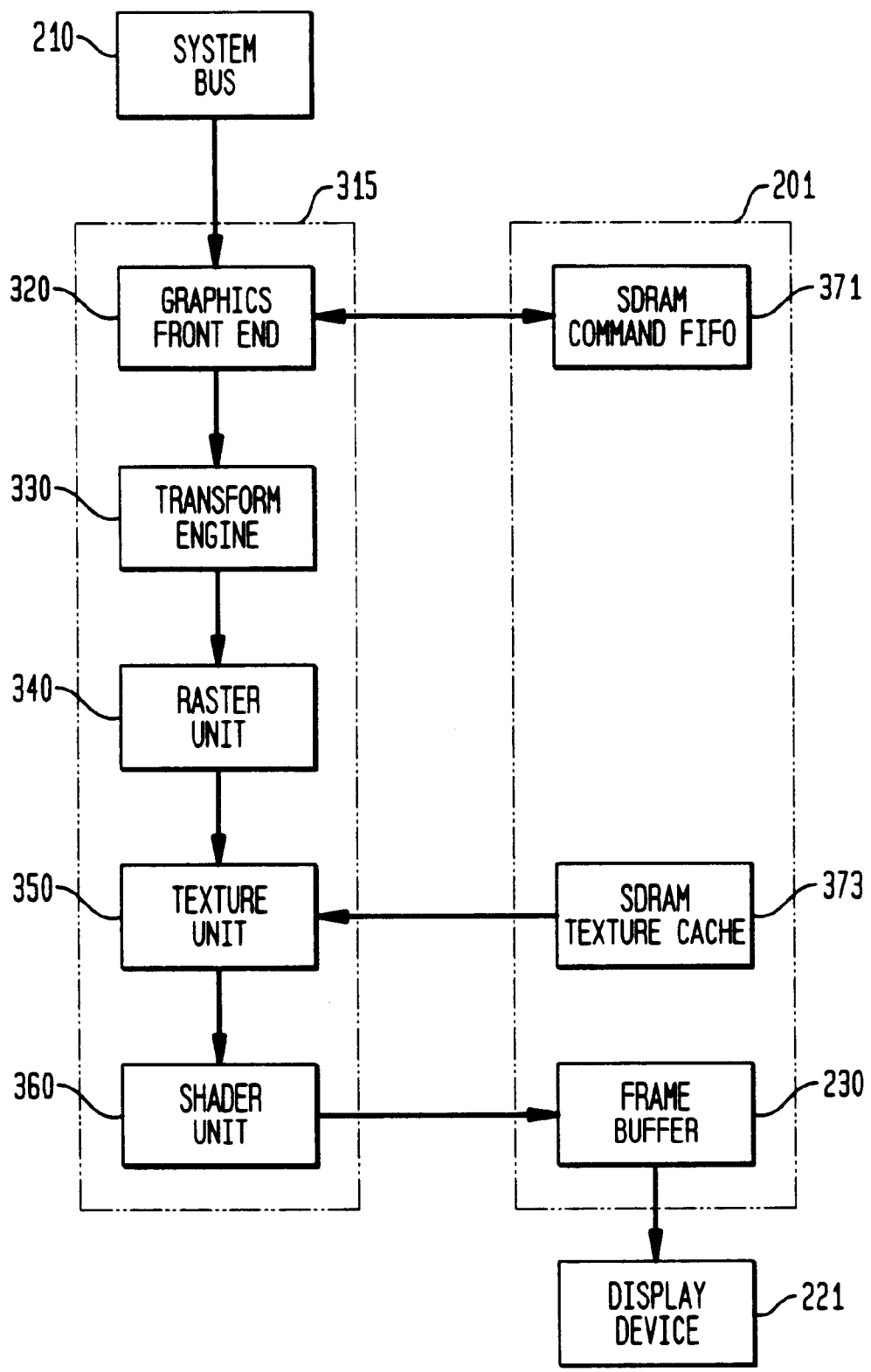
FIG. 3 is a block diagram of a processor implemented in the computer system of FIG. 2 in accordance with one embodiment of the present invention.

FIG. 3 is a block diagram of processor 315 in accordance with the present embodiment of the present invention. In one embodiment, processor 315 is a RISC processor; however, it is understood that other types of processors may be used in accordance with the present invention.

Processor 315 is implemented as part of graphics subsystem 211 in computer system 200 (FIG. 2). In accordance with the present invention, processor 315 is a single integrated circuit comprising graphics front end 320, transform engine 330, raster unit 340, texture unit 350, and shader unit 360. Because processor 315 is implemented as a single integrated circuit, the present invention reduces the amount of hardware required to implement the graphics design process, thereby reducing costs.

In the present embodiment, vertices are operated on one at a time in the graphics pipeline defined by the datapath through processor 315, although a second vertex can enter the pipeline before the preceding one exits.

In the present embodiment, a datapath exists between graphics front end 20 and synchronous dynamic random access memory (SDRAM Command FIFO 371) (FIFO is a term used in the art and refers to first-in, first-out). SDRAM Command FIFO 371 provides vertex data (e.g., vertex coordinates and associated attributes).

In one embodiment, graphics front end 320 also includes a shadow state (not shown) for context switching purposes. The shadow state contains the complete state for the set of attributes associated with the vertex currently being operated on as well as the complete state for the three preceding vertices.

Continuing with reference to FIG. 3, transform engine 330 is a transform mechanism that performs all the geometry and lighting calculations for a vertex, such as vertex matrix multiply (e.g., dot product), normal transformation, texture coordinate generation and transformation, and perspective division. Transform engine 330 also includes local memory for storing information and interim results for the geometry and lighting calculations. Additional information regarding transform engine 330 is provided below in conjunction with FIG. 4.

With reference still to FIG. 3, raster unit 340 performs the rasterization process; that is, the vertex data are converted into fragments that correspond to a single element (e.g., a pixel) in the graphics display and include data defining the associated attributes (e.g., color).

Texture unit 350 performs the texture mapping process; for example, texture images are applied in order to modify the color of a fragment to make it appear more realistic. SDRAM texture cache 373 stores texture data which is retrieved by texture unit 350 for the texture mapping process.

Shader unit 360 performs the shading process; that is, the line or polygon that is defined by the vertices is filled in (interpolated) using either a single color (e.g., flat shading) or using many different colors (e.g., smooth shading or Gouraud shading).

With reference still to FIG. 3, the fragments and their associated attributes are stored in framebuffer 230 and are used to draw images for display on display device 221.

Although raster unit 340, texture unit 350, and shader unit 360 are shown as separate units in FIG. 3, it is understood that these units may be integrated into a single raster/texture/shading unit in accordance with the present invention. It is also understood that the raster, texture and shading processes may be combined; indeed, these processes are sometimes collectively referred to in the art as the rasterization process.

Figure 4:
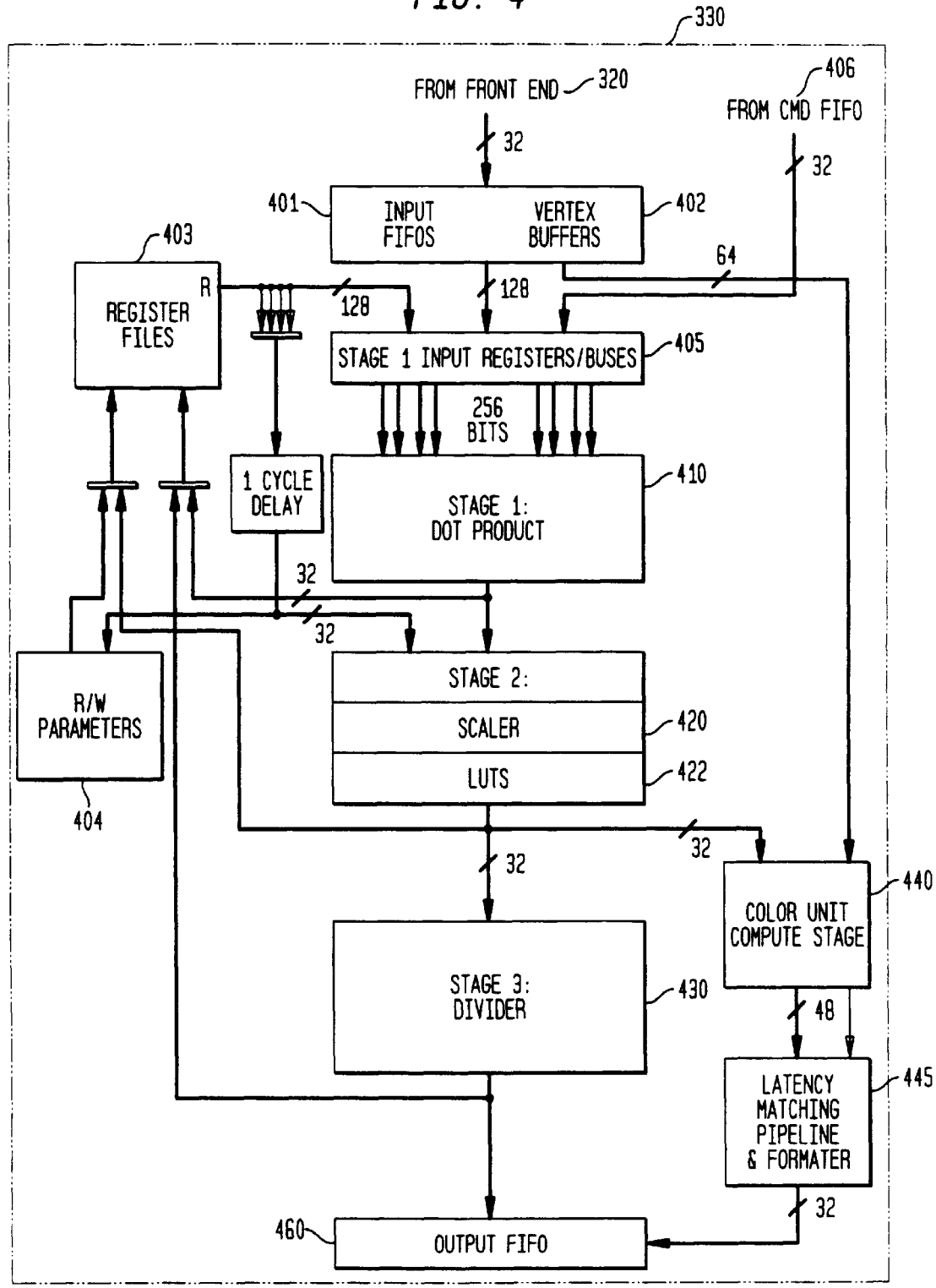
FIG. 4 is a block diagram of a transform mechanism implemented by the processor of FIG. 3 in accordance with one embodiment of the present invention.

Refer now to FIG. 4, which is a block diagram of a transform mechanism (e.g., transform engine 330) implemented by processor 315 (FIG. 3) in accordance with the present embodiment of the present invention. Transform engine 330 is implemented as a single integrated circuit in processor 315, and thus the present invention reduces the hardware required for the graphics design process, thereby reducing costs.

Graphics front end 320 provides vertex data (e.g., vertex coordinates and associated attributes such as color and texture) from SDRAM Command FIFO 371 (FIG. 3) to input FIFOs/vertex buffers 402. In the present embodiment, there are two input FIFOs for transform engine 330. Input command FIFO 406 contains commands that, for example, identify the type of data and specify the amount of data. Input data FIFO 401 contains all data associated with a command. It is understood that other FIFO configurations can be used in accordance with the present invention.

In the present embodiment, vertex buffers 402 consist of two buffers, each of which holds vertex data and associated attributes for one vertex, although it is understood that a different configuration of buffers can be used in accordance with the present invention. Vertex buffers 402 are written from input data FIFO 401. While the data from one of the two buffers of vertex buffers 402 are being read by the downstream elements of transform engine 330, the other buffer is updated from input data FIFO 401. In the present embodiment, vertex attributes are copied from one buffer to the other in vertex buffers 402. This allows a vertex to inherit an attribute from a preceding vertex.

In the present embodiment, register files 403 and parameter files 404 store operands for the datapath of transform engine 330. Register files 403 store dot product source vectors and the various transformation matrices used in the graphics process. Parameter files 404 serve as a storage area for register files 403, and hold parameters and constants needed for the geometry and lighting calculations.

Input registers/busses 405 are used to store vertex data and attributes for Stage 1 of transform engine 330. An operand is loaded into input registers/busses 405 from input data FIFO 401 and vertex buffers 402.

Continuing with reference to FIG. 4, Stage 1 of transform engine 330 is dot product unit 410. Dot product unit 410 takes the input from input registers/busses 405 and performs the dot product operation. Dot product unit 41C) computes the transformations used in the three-dimensional graphics computations, such as the vertex object space to clip space transform (MVP), the normal to eye space transform (MV), and the texture coordinate transforms (T).

In the present embodiment, the present invention processor incorporates dedicated hardware and microcode instructions specifically designed to perform a dot product operation. Dot product unit 410 of processor 315 computes the dot product of the vector representing the vertex and a row of a transformation matrix (e.g., MVP, MV, T). Four dot products are performed, consisting of a dot product of the vector and each of the four rows of the matrix. The clot product operation of the present invention is computed using a fused multiply and add operation in lieu of separate multiplication and addition operations. Thus, the present invention integrates hardware design and microcode instructions with the graphics design process. In this manner, the present invention optimizes processing speed and reduces hardware requirements, and consequently reduces costs.

In the present embodiment, dot product 410 employs two registers, designated herein as A and B. To execute a sequence of dot products, both registers A and B are loaded, and each cycle thereafter a new set of operands are loaded. Dot product unit 410 is fully pipelined and produces a result each clock cycle. An implementation of the dot product of a vertex and the MVP matrix appears as:
Load A with MVP(0,0),MVP(0,1),MVP(0,2),MVP(0,3); Load B with X,Y,Z,W Compute Dot; Load A with MVP(1,0),MVP(1,1),MVP(1,2),MVP(1,3) Compute Dot; Load A with MVP(2,0),MVP(2,1),MVP(2,2),MVP(2,3) Compute Dot; Load A with MVP(3,0),MVP(3,1),MVP(3,2),MVP(3,3) Compute Dot Store result of first Dot Product Store result of second Dot Product Store result of third Dot Product Store result of fourth Dot Product In the present embodiment, dot product unit 410 also includes an operating mode in which data from either vertex buffers 402 or register files 403 are passed through the unit without being operated on. This enables transform engine 330 to pass data directly to Stage 2 or to raster unit 340 (FIG. 3).

The output data from dot product unit 410 is sufficiently precise for graphics applications. In the present embodiment, single-precision floating point numbers are converted in graphics front end 320 prior to their use in transform engine 330. All NaNs (not a number), infinite values, and the like are represented as a maximum value (that is, the largest number that can be realized according to the format specified for the graphics application). Accordingly, in the present invention, it is not necessary to consider conditional branches or to provide microcode instructions for the conditional branches, thereby simplifying the logic and control of the graphics process. Consequently, the present invention makes it easier to pipeline data and to use simpler microcode instructions that require less storage space. In this manner, the present invention provides faster processing, less hardware, and therefore less cost.

With reference still to FIG. 4, in the present embodiment, Stage 2 of transform engine 330 includes scaler element 420 and look-up tables 422. scaler element 420 is for multiplying a single value by another value in those instances where the dot product operation (Stage 1, dot product unit 410) is not executed. In the present embodiment, look-up tables 422 include four functions: arc-sin(x), exponent(x), inverse square-root(x), and negate(x). The use of look-up tables in accordance with the present invention increases processing speed and simplifies controlling the graphics process. The output of Stage 2 (scaler element 420 and look-up tables 422) is either loaded into register files 403 or sent to Stage 3 (perspective division element 430).

Perspective division element 430 is for performing divide operations (e.c., x/w, y/w, z/w, where x, y and z are the vertex coordinates and w is the coordinate for changing the size of an object to make it appear closer to or farther away from the viewer).

With reference still to FIG. 4, color unit 440 is used to compute the per-vertex lighting equations for multiple light sources (up to eight light sources in the present embodiment) and to pass per-pixel lighting terms that are to be subsequently interpolated by the shader (e.g., shader unit 360 of FIG. 3). In the present embodiment, color unit 440 loads lighting parameters (e.g., the ambient color of the object being rendered, the color of the ambient light, the diffused light component, and the specular component) either from vertex buffers 405 or from Stage 2 to a local register file (not shown). The computations performed using color unit 440 are accomplished using a multiplier followed by an adder. The adder adds to the previous sum the results of each multiplier operation; the local register holds the interim results of the lighting calculations.

Latency matching pipeline and formatter 445 formats the output from color unit 440 so that it can be written to output FIFO 460, and also matches the latency due to color unit 440 with the latency of Stage 3 (perspective division element 430). Output FIFO 460 feeds data to the rasterizer (e.g., raster unit 340 of FIG. 3).

Figure 5:
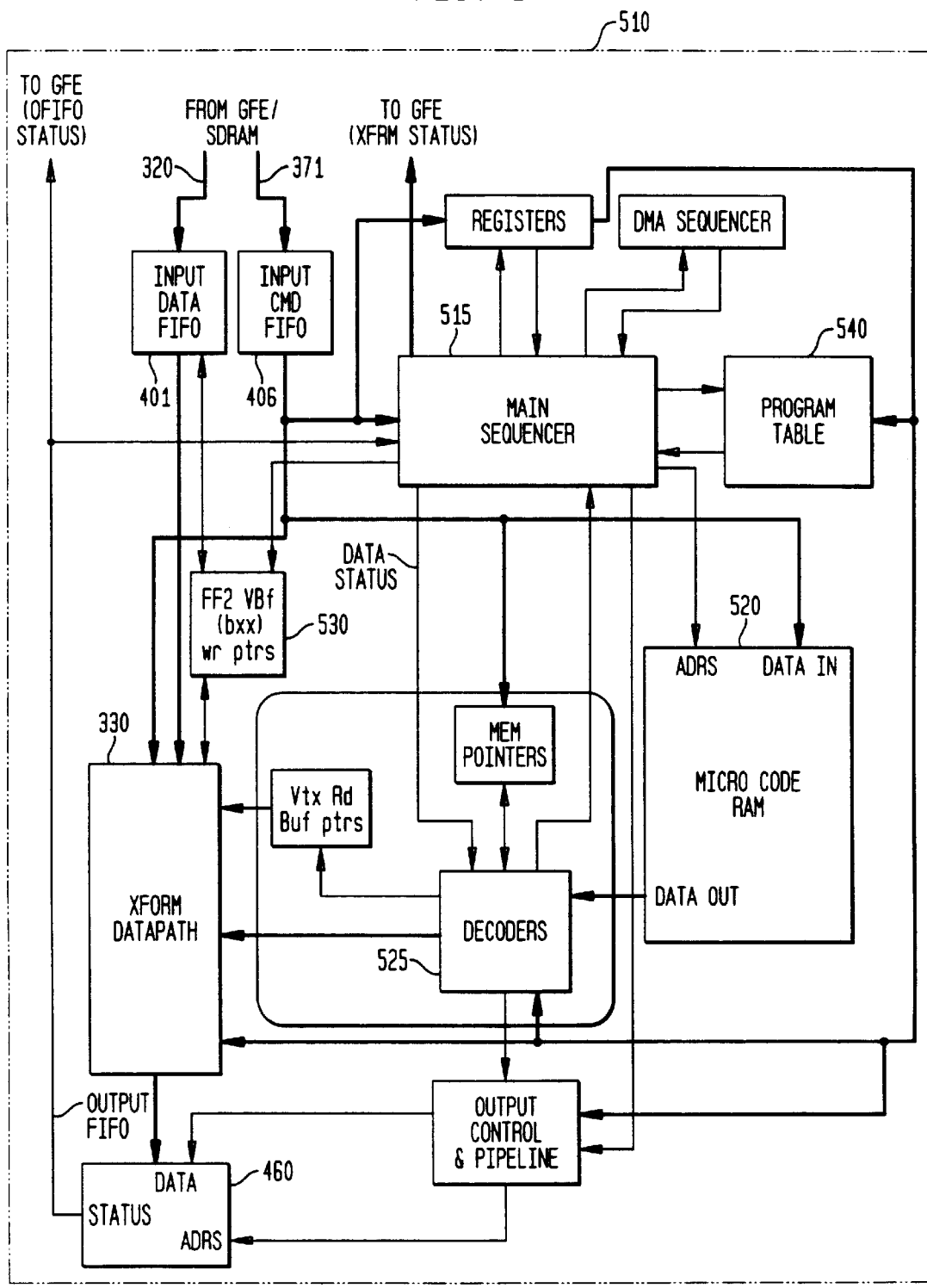
FIG. 5 is a block diagram of a transform mechanism sequencer in accordance with one embodiment of the present invention.

Refer now to FIG. 5, which is a block diagram of transform mechanism sequencer 510 in accordance with the present embodiment of the present invention. Transform mechanism sequencer 510 incorporates transform engine 330, input data FIFO 401, input command FIFO 406 and output FIFO 460 as described above in conjunction with FIG. 4. Vertex copier 530 copies information from input data FIFO 401 and input command FIFO 406 to input registers/busses 405 (FIG. 4).

With reference still to FIG. 5, the entire datapath of processor 315 is controllable using microcode instructions. Main sequencer 515 is for controlling the sequence of execution of microcode instructions stored in microcode RAM 520. The microcode is applied to the datapath control lines that define the operations being performed and the memory location which is being read from, for example. When microcode is executing, decoders 525 take bits in microcode and applies them directly to the datapath control lines in transform engine 330. When microcode is not being executed, decoders 525 holds the datapath control lines at pre-established values.

Program table 540 contains a list of addresses pointing to microcode fragments that are contained in the microcode instructions. The microcode fragments are pieced together to provide a complete microcode instruction. By storing the microcode as fragments that are then assembled into appropriate instructions, instead of storing assembled strings of microcode, common fragments that are repeated in more than one instruction are instead only stored in one place. Accordingly, microcode instructions are customized according to the operations that are to be performed. Thus, conditional branches are not required; the processor recognizes ahead of time that a certain condition will be occurring, and so microcode instructions are derived and programmed for that condition. For example, if there is a need to normalize a vector, the appropriate fragment of microcode for normalizing a vector is added to the microcode instructions; otherwise, if there is no need to normalize a vector, the appropriate microcode fragment is not added. Therefore, in accordance with the present invention, there is a substantial reduction in the amount of space needed to store microcode. The present invention thereby reduces the size of the processor and consequently reduces costs.

Refer now to FIG. 6, which is a flowchart of process 600 for performing graphics design calculations using processor 315 (FIG. 3) in accordance with the present embodiment of the present invention.

With reference now to FIGS. 3, 4 and 6, in step 605, vertex data (e.g., the vertex coordinates and associated attributes such as color and material properties) are received from the graphics front end (e.g., graphics front end 320). In accordance with the present invention, a single vertex is operated on at a time. The vertex data are formatted by graphics front end 320 compliant with the format used by transform engine 330. Graphics front end 320 provides the vertex data including the associated attributes to input registers/busses 405 via input data FIFO 401 and vertex buffers 402.

In step 610, the vertex coordinates are transformed using a dot product operation in dot product unit 410. In accordance with the present invention, the dot product operation is performed using dedicated hardware and associated microcode instructions specifically designed for the dot product operation. Instead of performing a series of separate multiply and add operations in order to calculate a dot product, the present invention implements a dot product operation using the specifically designed hardware and instructions. Thus, the present invention computes the dot product faster and thereby increases processing speed.

In step 615, for those cases where the dot product operation is not executed, the vertex properties are transformed by performing multiplication in scaler element 420 and by using the functions included in look-up tables 422 (namely, arc-sin(x), exponent(x), inverse square-root(x), and negate (x)).

In step 620, lighting calculations are performed in color unit 440. In the present embodiment, color unit 440 computes the lighting equations for eight light sources. Color unit 440 operates on the lighting parameters (such as the ambient color of the object and of the light, the diffused light component, and the specular component) obtained from vertex buffers 405 or from scaler element 420 and look-up tables 422. Color unit 440 provides the output from the lighting calculations to output FIFO 460 in a format consistent with the format used by raster unit 340.

In step 625, concurrent with step 620, perspective division of the transformed vertex coordinates is performed in perspective division element 430 and the results are provided to output FIFO 460.

In step 630, in the present embodiment, rasterization, texture and shading are performed by raster unit 340, texture unit 350, and shader unit 360, respectively.

In step 640, the results are stored in framebuffer 230 as pixel data.

The present invention thus provides a specialized hardware processor for the geometry and lighting calculations for computer-generated graphics design. The present invention is a processor specifically designed for geometry and lighting calculations. The present invention processor incorporates an entire graphics engine (e.g., the geometry engine as well as the raster/texture/shader) into a single integrated circuit. Consequently, the present invention reduces the hardware requirements for the graphics design process and accordingly also reduces the costs. In one embodiment, the processor of the present invention is a RISC processor.

The present invention incorporates hardware and microcode specifically designed to perform the dot product (e.g., dot product unit 410), thereby calculating the dot product faster and increasing processing speed. In addition, the present invention incorporates a scaler element and look-up tables. The present invention also eliminates conditional branches, so that the microcode instructions that control the graphics operations are significantly simplified. Thus, the microcode instructions consume less memory, thereby reducing the size of the processor and consequently reducing costs.

The present invention is compliant with OpenGL by Silicon Graphics, Inc., of Mountain View, Calif., and is capable of implementing the full set of OpenGL commands.

In summary, the present invention introduces specialized hardware integrated with microcode instructions allowing a complete graphics engine to be implemented in a single processor, and thereby reducing costs. The present invention simplifies process control and increases processing speed. Accordingly, the present invention allows more complex scenes to be rendered.

The preferred embodiment of the present invention, a processor for geometry transformations and lighting calculations, is thus described. While the present invention has been described in particular embodiments, it should be appreciated that the present invention should not be construed as limited by such embodiments, but rather construed according to the following claims.

What is claimed is:

1. A processor for computer graphics calculations, comprising:
a transform mechanism farther comprising:
a transformation element adapted to compute transforms for said computer graphics calculations;
a color unit coupled to said transformation element, said color unit for performing lighting calculations; and
a perspective division element coupled to said transformation element;
a raster unit coupled to said transform mechanism;
a texture unit coupled to said raster unit; and
a shader unit coupled to said texture unit;
wherein said raster unit, said texture unit, said shader unit, and said transform mechanism including said transformation element, said color unit, and said perspective division element, are each formed in a single integrated circuit; and
a set of reduced instructions for controlling said computer graphics calculations carried out by said transform mechanism, said set of reduced instructions including microcode fragments that are assembled into a complete microcode instruction corresponding to a specific graphics calculation.

2. The processor of claim 1 wherein said processor is a RISC (reduced instruction set computer) processor.

3. The processor of claim 1 wherein said transformation element is adopted to perform a dot product operation.

4. The processor of claim 3 wherein said dot product operation comprises a dot product of coordinates representing a vertex in a computer graphics image with a row of a coordinate transformation matrix.

5. The processor of claim 1 wherein said transform mechanism further comprises a scaler element coupled to said transformation element for executing a multiplication operation.

6. The processor of claim 1 wherein said transform mechanism further comprises a look-up table coupled to said transformation element containing mathematical functions used by said computer graphics calculations.

7. A processor for computer graphics calculations, said processor a single integrated circuit comprising:
a transform mechanism further comprising:
a transformation element adapted to compute transforms for said computer graphics calculations;
a color unit coupled to said transformation element, said color unit for performing lighting calculations; and
a perspective division element coupled to said transformation element;
a raster unit coupled to said transform mechanism;
a texture unit coupled to said raster unit; and
a shader unit coupled to said texture unit wherein said transform mechanism further comprises a look-up table coupled to said transformation element containing mathematical functions used by said computer graphics calculations, and
wherein said mathematical operations contained in said look-up table are selected from a group consisting of: an exponent function, a negate function, an arc-sin function, and an inverse square root function.

8. The processor of claim 1 wherein said color unit computes lighting equations for a vertex for multiple light sources.

9. The processor of claim 1 wherein said set of reduced instructions further controls computer graphics calculations carried out in said color unit and said perspective division element and said set of reduced instructions including microcode fragments that are assembled into a complete microcode instruction corresponding to a specific graphics calculation.

10. A processor for computer graphics calculations, comprising:
a transform element for computing transforms for said computer graphics calculations said transform element adapted to perform a dot product operation, wherein said transform element is formed on a single integrated circuit; and
a set of reduced instructions for controlling said computer graphics calculations carried out by said transform element, said set of reduced instructions including microcode fragments that are assembled into a complete microcode instruction corresponding to a specific graphics calculation.

11. The processor of claim 10 wherein said dot product operation comprises a dot product of coordinates representing a vertex in a computer graphics image with a row of a coordinate transformation matrix.

12. The processor of claim 10 wherein said processor is a RISC (reduced instruction set computer) processor.

13. The processor of claim 10 comprising:
a transform mechanism further comprising:
said transform element;
a color unit coupled to said transform element, said color unit for performing lighting calculations; and
a perspective division element coupled to said transform element;
a raster unit coupled to said transform mechanism;
a texture unit coupled to said raster unit; and
a shader unit coupled to said texture unit; wherein said raster unit, said texture unit, said shader unit, and said transform mechanism including said transform element, said color unit, and said perspective division element, are each formed in said single integrated circuit.

14. The processor of claim 13 wherein said transform mechanism further comprises a scaler element coupled to said transformation element for executing a multiplication operation.

15. The processor of claim 13 wherein said transform mechanism further comprises a look-up table coupled to said transformation element for executing mathematical operations required by said computer graphics calculations.

16. A processor for computer graphics calculations, said processor comprising:
a transform element for computing transforms for said computer graphics calculations, said transform element adapted to perform a dot product operation, wherein said processor comprises a single integrated circuit comprising:
a transform mechanism farther comprising:
said transformation element;
a color unit coupled to said transformation element, said color unit for performing lighting calculations; and
a perspective division element coupled to said transformation element;
a raster unit coupled to said transform mechanism;
a texture unit coupled to said raster unit; and
a shader unit coupled to said texture unit,
wherein said transform mechanism further comprises a look-up table coupled to said transformation element for executing mathematical operations required by said computer graphics calculations, and wherein said mathematical operations contained in said look-up table are selected from a group consisting of: an exponent function, a negate function, an arc-sin function, and an inverse square root function.

17. The processor of claim 13 wherein said color unit computes lighting equations for a vertex for multiple light sources.

18. A method for performing computer graphics calculations using a processor formed in a single integrated circuit, said method comprising the steps of:
   a) receiving coordinates at a transform mechanism of said processor, said coordinates representing a vertex in a computer graphics image;
   b) computing a transform of said coordinates using a transform element of said transform mechanism;
   c) performing lighting calculations for said vertex using a color unit of said transform mechanism;
   d) performing perspective division on said transform using a perspective division element of said transform mechanism;
   e) rasterizing said transform using a raster unit of said processor;
   f) texturing said transform using a texture unit of said processor; and
   g) shading said transform using a shader unit of said processor; and
   h) using a set of reduced instructions to control computer graphics calculations in said transform computing step (b), said set of reduced instructions comprising microcode fragments that are assembled into a complete microcode instruction corresponding to a specific graphics calculation.

19. The method of claim 18 wherein said processor is a RISC (reduced instruction set computer) processor.

20. The method of claim 18 wherein step b) further comprises computing a dot product of said coordinates with a row of a coordinate transformation matrix.

21. The method of claim 18 wherein step b) further comprises scaling said coordinates using a scaler element of said transform mechanism.

22. The method of claim 18 wherein step b) further comprises operating on said coordinates using a mathematical function contained in a look-up table of said transform mechanism.

23. The method of claim 18 wherein said step (h) comprises using said set of reduced instructions to control computer graphics calculations in said performing lighting calculations step (c) or said performing perspective division step (d), said set of reduced instructions comprising microcode fragments that are assembled into a complete microcode instruction corresponding to a specific graphics calculation.

24. A transform mechanism sequencer, comprising:
   a memory that stores microcode instructions including microcode fragments;
   a data structure that identifies microcode fragments contained in said microcode instructions;
   a main sequencer that determines a sequence of microcode instructions to be executed, said sequence including at least one customized microcode instruction assembled from microcode fragments; and
   a transform engine having a datapath along which input graphics data is transformed into output graphics data in response to execution of said sequence of microcode instructions.

25. The transform mechanism sequencer of claim 24, further comprising:
   control lines in said transform engine datapath; and
   decoders coupled between said memory and said control lines; wherein said decoders apply bits of microcode instructions to said control lines when microcode instructions are executing and hold said control lines at pre-established values when microcode instructions are not executing.

26. The transform mechanism sequencer of claim 24, wherein said data structure comprises a program table that lists addresses pointing to said microcode fragments contained in said microcode instructions.

27. The transform mechanism sequencer of claim 24, wherein said input graphics data includes input vertex coordinate data and said output graphics data includes transformed vertex coordinate data, and further comprising:
   an input command FIFO that contains commands;
   an input data FIFO that contains data associated with the commands in said input command FIFO; and
   a vertex copier that copies data contained in said input command FIFO and input data FIFO and outputs the copied data to said transform engine.

28. The transform mechanism sequencer of claim 26, wherein said transform engine comprises a pipeline that includes:
   a first stage;
   a second stage; and
   a third stage;
      wherein said first stage includes two operating modes, in one operating mode said first stage computes at least one three-dimensional graphics transformation upon input vertex coordinate data and outputs transformed vertex coordinate data, and in the other operating mode said first stage passes input vertex coordinate data to said second stage without performing a three-dimensional graphics transformation;
      wherein said second stage performs a multiplication operation upon the input vertex coordinate data received from the first stage in the other operating mode and outputs transformed vertex coordinate data to said third stage; and
      wherein said third stage performs perspective divide operations on the transformed vertex coordinate data transformed previously by the three-dimensional graphics transformation in the first stage or by the multiplication operation in the second stage to obtain the transformed output vertex coordinate data.

29. The transform mechanism sequencer of claim 28, wherein said transform engine further includes a color unit that computes per-vertex lighting equations for multiple light sources to obtain per-pixel lighting data.

30. The transform mechanism sequencer of claim 29, wherein said transform engine further includes a latency matching pipeline and formatter that formats per-pixel lighting data output from said color unit for writing into an output FIFO and matches latency of said color unit with latency of said third stage.

31. A transform mechanism sequencer, comprising:
   means for storing microcode instructions including microcode fragments;
   means for identifying microcode fragments contained in said microcode instructions;
   means for determining a sequence of microcode instructions to be executed, said sequence including at least one customized microcode instruction assembled from microcode fragments; and means for transforming input graphics data into output graphics data in response to execution of said sequence of microcode instructions.

32. A pipelined transform engine, comprising:

a first stage;

a second stage; and a third stage;

wherein said first stage includes two operating modes, in one operating mode said first stage computes at least one three-dimensional graphics transformation upon input vertex coordinate data and outputs transformed vertex coordinate data, and in the other operating mode said first stage passes input vertex coordinate data to said second stage without performing a three-dimensional graphics transformation;

wherein said second stage performs a multiplication operation upon the input vertex coordinate data received from the first stage in the other operating mode and outputs transformed vertex coordinate data to said third stage;

wherein said third stage performs perspective divide operations on the transformed vertex coordinate data transformed previously by the three-dimensional graphics transformation in the first stage or by the multiplication operation in the second stage to obtain the transformed output vertex coordinate data;

wherein said first through third stages are each formed in a single integrated circuit; and wherein said first through third stages each include control lines that receive bits of microcode instructions including microcode instructions that are assembled from stored microcode fragments in accordance with operations to be performed, whereby conditional branches are not required and microcode storage space is reduced.

33. The pipelined transform engine of claim 32, further comprising:

a graphics front end that provides input vertex coordinate data representative of at least one vertice of a primitive to said first stage.

34. The pipelined transform engine of claim 32, wherein said first stage comprises a dot product unit that performs a fused multiply and add operation to compute four dot products of a vector representing a vertex and respective rows of a transformation matrix.

35. The pipelined transform engine of claim 32, wherein said transform engine further includes a color unit that computes per-vertex lighting equations for multiple light sources to obtain per-pixel lighting data.

36. The transform mechanism sequencer of claim 35, wherein said transform engine further includes a latency matching pipeline and formatter that formats per-pixel lighting data output from said color unit for writing into an output FIFO and matches latency of said color unit with latency of said third stage.

* * * * *